US005629376A

United States Patent [19]
Sargent et al.

[11] Patent Number: 5,629,376
[45] Date of Patent: *May 13, 1997

[54] POLYACRYLIC ACID COMPOSITIONS FOR TEXTILE PROCESSING

[75] Inventors: R. Richard Sargent; Michael S. Williams; Thomas H. Moss, III, all of Rome; Jeffrey R. Alender, Marietta, all of Ga.

[73] Assignee: Peach State Labs, Inc., Rome, Ga.

[*] Notice: The term of this patent shall not extend beyond the expiration date of Pat. No. 5,212,272.

[21] Appl. No.: 63,211

[22] Filed: May 17, 1993

Related U.S. Application Data

[63] Continuation-in-part of Ser. No. 606,467, Oct. 31, 1990, Pat. No. 5,212,272.

[51] Int. Cl.⁶ .................. C08K 5/42; C11D 1/22; C08F 2/00; C08F 122/18; C08F 130/02; C08F 128/02; C08F 120/54

[52] U.S. Cl. .................. 524/745; 526/245; 526/225; 526/277; 526/287; 526/303.1; 526/317.1; 526/328; 510/278; 510/476; 510/245

[58] Field of Search .................. 526/225, 245, 526/277, 287, 303.1, 317.1, 328; 524/745; 252/553

[56] References Cited

U.S. PATENT DOCUMENTS

| | | |
|---|---|---|
| 2,566,149 | 8/1951 | Strain . |
| 2,639,279 | 5/1953 | Caldwell . |
| 3,406,005 | 10/1968 | Whitfield . |
| 3,577,212 | 5/1971 | Jirou et al. . |
| 3,622,543 | 11/1971 | Garforth . |
| 3,959,559 | 5/1976 | Kimoto et al. . |
| 3,994,744 | 11/1976 | Anderle et al. . |
| 3,994,990 | 11/1976 | Foote . |
| 4,081,383 | 3/1978 | Warburton et al. . |
| 4,082,739 | 4/1978 | Seitz . |
| 4,187,383 | 2/1980 | Cowherd, III et al. . |
| 4,203,859 | 5/1980 | Kim et al. . |
| 4,317,859 | 3/1982 | Smith . |
| 4,334,876 | 6/1982 | Beier et al. . |
| 4,388,372 | 6/1983 | Champaneria et al. . |
| 4,407,848 | 10/1983 | Yamaguchi et al. . |
| 4,448,839 | 5/1984 | Morris . |
| 4,477,514 | 10/1984 | Gee et al. . |
| 4,507,324 | 3/1985 | Olive et al. . |
| 4,526,581 | 7/1985 | Prentiss et al. . |
| 4,595,518 | 6/1986 | Raynolds et al. . |
| 4,596,582 | 6/1986 | Logullo, Sr. . |
| 4,663,372 | 5/1987 | Okamoto et al. . |
| 4,690,995 | 9/1987 | Keskey et al. . |
| 4,699,812 | 10/1987 | Munk et al. . |
| 4,739,002 | 4/1988 | Ishikawa et al. . |
| 4,822,373 | 4/1989 | Olson et al. . |
| 4,839,212 | 6/1989 | Blyth et al. . |
| 4,865,885 | 9/1989 | Herlant et al. . |
| 4,875,901 | 10/1989 | Payet et al. . |
| 4,879,180 | 11/1989 | Blyth et al. . |
| 4,886,707 | 12/1989 | Marshall . |
| 4,937,123 | 6/1990 | Chang et al. . |
| 4,940,757 | 7/1990 | Moss, III et al. . |
| 4,963,409 | 10/1990 | Liss et al. . |
| 5,015,259 | 5/1991 | Moss, III et al. . |
| 5,061,763 | 10/1991 | Moss, III et al. . |
| 5,212,272 | 5/1993 | Sargent et al. .......... 526/317.1 |
| 5,223,340 | 6/1993 | Moss, III et al. . |
| 5,316,850 | 5/1994 | Sargent et al. . |

FOREIGN PATENT DOCUMENTS

| | | |
|---|---|---|
| 0118983 | 9/1984 | European Pat. Off. . |
| 0345212 | 12/1989 | European Pat. Off. . |
| 0417960 | 3/1991 | European Pat. Off. . |
| WO91/14512 | 10/1991 | WIPO . |
| WO92/18332 | 10/1992 | WIPO . |

OTHER PUBLICATIONS

*American Dyestuff Reporter* 77(5), 36 (1988).
*Man–Made Fibers*, 4th Ed., Heywood Books (1966), pp. 646–651.
*World Abstract*, 312 vol. 8(1) 1976/3155.
*World Textile Abstract*, vol. 19(6) 1987/1675.
*World Textile Abstract*, vol. 19(6) 1987/1678.
*World Textile Abstract*, vol. 15(24) 1983/7785.
*World Textile Abstract*, vol. 15(20) 1983/6589.
*World Textile Abstract*, vol. 15(20) 1983/6590.

(List continued on next page.)

*Primary Examiner*—Joseph L. Schofer
*Assistant Examiner*—Wu C. Cheng
*Attorney, Agent, or Firm*—Kilpatrick & Cody

[57] ABSTRACT

Novel polyacrylic acid resins are prepared by polymerizing a monomer selected from the group consisting of $H_2C=CHCO_2X$, $H_2C=CR^1CO_2X$, $HR^2C=CHCO_2X$, $HR^2C=CR^1CO_2X$, $HR^2C=CHCOX$, $H_2C=CHCOX$, $H_2C=CR^1COX$, $HR^2C=CR^1COX$, $H_2C=CHCSO_vX$, $HR^2C=CHCSO_vX$, $HR^2C=CR^1CSO_vX$, $H_2C=CR^1CSO_vX$, $H_2C=CHCON(R^3)_2$, $HR^2C=CHCON(R^3)_2$, $H_2C=CR^1CON(R^3)_2$, OR $HR^2C=CR^1CON(R^3)_2$, or a combination thereof, in the presence of at least 10% by weight of reaction components of an aromatic sulfonic acid or its salt, wherein:

$R^1$ and $R^2$ are independently a substituted or unsubstituted alkyl, alkenyl, aromatic, aralkyl or alkaryl moiety of $C_1$ to $C_{20}$;

$R^3$ is independently hydrogen or a substituted or unsubstituted alkyl, alkenyl, aromatic, aralkyl or alkaryl moiety of $C_1$ to $C_{20}$; and X is hydrogen, substituted or unsubstituted alkyl, alkenyl, aromatic, aralkyl, or alkaryl moiety of $C_1$ to $C_{20}$; $-CH_2CH_2(CF_2CF_2)_nCF_2CF_3$, wherein n is 1–7; polyoxyalkylene; $-C(R^2)_2R^3Y$, wherein $R^3$ is alkylene or polyoxyalkylene (or a combination thereof), and Y is $-OSO_3H$, $-SO_3H$, $-CO_2H$, $-PO_3H$, $-OPO_3H$, or a salt thereof; $CF_3(CF_2)_q-$, wherein q is 1–11, hexafluorobutyl, tetrafluoropropyl, sodium, potassium, lithium, ammonium, or quaternary amine; and v is 0, 1, or 2.

23 Claims, No Drawings

OTHER PUBLICATIONS

*World Textile Abstract*, vol. 17(1) 1985/155.
*Chemical Abstract* 110:156016k, (1989).
*Chemical Abstract*, 111:8831c, (1989).
*Chemical Abstract*, 105:210361f, (1986).
*Chemical Abstract*, 102:205391z, (1985).
*Chemical Abstract*, 92:95595j, (1980).
*Chemical Abstract*, 98:199765e, (1983).
*Chemical Abstract*, 102:115098e, (1985).
*Chemical Abstract*, 80:97290q, (1974).
*Chemical Abstract*, 107:116954w, (1987).
*World Textile Abstract*, vol. 9(13) 1977/5207.
*World Textile Abstract*, vol. 11 1979/3919.
*World Textile Abstract*, vol. 7 1975/1304.
*Chemical Abstract*, 112:21868k, (1990).

POLYACRYLIC ACID COMPOSITIONS FOR TEXTILE PROCESSING

BACKGROUND OF THE INVENTION

This application is a continuation-in-part application of U.S. Ser. No. 07/606,467, filed on Oct. 31, 1990 by R. Richard Sargent and Michael S. Williams, now U.S. Pat. No. 5,212,272.

This invention is in the area of polymer chemistry, and in particular relates to a group of novel polyacrylic acid derivatives that can be used in a variety of applications, including textile applications, and as coatings for hard and soft surfaces, including paper, wood, and stone.

Polymethacrylic acid and polyacrylic acid, as well as their copolymers, are important polyelectrolytes that are widely used in industry for a number of applications, including as thickening agents for paints, suspending agents for inorganic pigments, flocculants in metal ore recovery, and in ion-exchange resins, coatings and dispersants. For example, U.S. Pat. No. 4,043,965 to Dickson describes a copolymer of acrylic acid and 1,1-dihydroperfluorooctyl methacrylate that is useful as a soil-release finish in the rinse cycle of a home laundry process. U.S. Pat. No. 4,680,128 to Portnoy discloses low molecular weight copolymers of acrylic acid and salts of vinylsulfonic acid for use as dispersants and deflocculants.

Polymethacrylic acid and a number of copolymers and blends thereof have been used increasingly to impart stain resistance to nylon (polyamide) fibers. The anionic moieties of the polymers ionically bind to protonated terminal amines in the polyamide, blocking subsequent ionic bonding by anionically charged dyes. U.S. Pat. No. 4,937,123 to Chang, et al., assigned to Minnesota Mining and Manufacturing Company, describes the use of polymethacrylic acid and copolymers of methacrylic acid with other ethylenically unsaturated monomers to impart stain resistant properties to nylon fibers. U.S. Pat. No. 4,822,373 to Olson, also assigned to Minnesota Mining and Manufacturing Company, describes a stain resistant composition prepared by blending a partially sulfonated novolak resin with a polymethacrylic acid, or a copolymer of methacrylic acid with ethylenically unsaturated monomers. U.S. Pat. No. 4,940,757 to Moss, et al., assigned to Peach State Labs, Inc., describes a stain resistant polymeric composition that includes a polymer prepared by polymerizing an α-substituted acrylic acid in the presence of a sulfonated formaldehyde condensation polymer (a novoloid resin) to form a polymeric composition. The composition has superior stain resist properties over a mere blend of a poly(α-substituted acrylic acid) and a novoloid resin as described in '373 to Olson.

A number of chemical agents other than stain resist agents are required during textile processing and handling. Examples include dye levelers, acids to adjust Ph, cleaning agents (detergents, shampoos, and surfactants), emulsifiers, yarn lubricants, defoamers, antistatic agents, flame retardants, ultra-violet absorbing agents, and finishing resins. A substantial amount of the agents currently used typically remain in the wastewater after use, increasing the B.O.D. (biological oxygen demand) and C.O.D. (carbon oxygen demand) of the wastewater. The agents also increase the hazardous nature of the wastewater, which significantly increases the burden of water purification placed on the company and on the publicly owned treatment facilities.

For many textile applications, a textile processing solution is desired that is in the form of an aqueous solution or an aqueous stable dispersion. U.S. Pat. No. 2,639,279 to Caldwell discloses a method for the precipitation polymerization of unsaturated monomers, wherein the unsaturated monomers are polymerized in an aqueous solution of an alkali metal salt of an aromatic sulfonic acid of the benzene series. The patent teaches that while the monomers are soluble in the aqueous solution of an alkali metal salt of the aromatic sulfonic acid, the polymer prepared from the process falls out of the solution as a granular precipitate. The precipitate is separated, purified, and washed with water. The patent does not teach how to prepare water soluble solutions or water stable dispersions of polymeric compositions that would be suitable for use in textile applications.

It would also be of significant environmental benefit to develop textile processing chemicals that adhere to the textile fiber (that would be exhausted onto the fiber) instead of remaining in the wastewater to be removed later at significant expense. It would be of even greater value to have an exhaustible processing chemical that improves the properties of the textile fiber for residential or commercial use.

It is therefore an object of the present invention to provide textile processing and handling agents that have improved performance over the currently used agents.

It is another object of the present invention to provide processing chemicals for textile applications that are exhausted onto synthetic and natural fibers and substrates.

It is still another object of the present invention to provide an exhaustible processing chemical that improves the properties of the synthetic and natural fibers and substrates.

It is still another object of the present invention to provide water soluble polymeric solutions and water stable polymeric dispersions for textile processing.

It is another object of the present invention to provide new acrylic-based coatings for hard and soft surfaces, including paper, wood, stone, concrete, brick, masonry, glass, ceramic, porcelain, hard plastics and rubbers, marble, granite, other architectural building materials, metals, and composites.

SUMMARY OF THE INVENTION

New polyacrylic acid based resins are prepared by polymerizing $H_2C=CHCO_2X$, $H_2C=CR^1CO_2X$, $HR^2C=CHCO_2X$, $HR^2C=CR^1CO_2X$, $HR^2C=CHCOX$, $H_2C=CHCOX$, $H_2C=CR^1COX$, $HR^2C=CR^1COX$, $H_2C=CHCSO_yX$, $HR^2C=CHCSO_yX$, $HR^2C=CR^1CSO_yX$, $H_2C=CR^1CSO_yX$, $H_2C=CHCON(R^3)_2$, $HR^2C=CHCON(R^3)_2$, $H_2C=CR^1CON(R^3)_2$, or $HR^2C=CR^1CON(R^3)_2$, or a combination thereof, in the presence of an aromatic sulfonic acid or its salt, wherein:

$R^1$ and $R^2$ are independently an alkyl, alkenyl, aromatic, aralkyl or alkaryl moiety of $C_1$ to $C_{20}$ that is optionally substituted with one or more halogen, hydroxyl, sulfate, sulfonic acid, phosphoric acid, or carboxylic acid moieties (or the corresponding sulfonic, phosphoric or carboxylic acid esters), or a combination thereof;

$R^3$ is independently hydrogen or an alkyl, alkenyl, aromatic, aralkyl or alkaryl moiety of $C_1$ to $C_{20}$ that is optionally substituted with one or more halogen, hydroxyl, sulfate, sulfonic acid, phosphoric acid, or carboxylic acid moieties (or the corresponding sulfonic, phosphoric or carboxylic acid esters), or a combination thereof; and X is hydrogen, alkyl, alkenyl, aromatic, aralkyl or alkaryl moiety of $C_1$ to $C_{20}$ that is optionally substituted with one or more halogen, hydroxyl, carboxylic acid, phosphoric acid, or sulfonic acid moieties (or the alkyl ester thereof); $-CH_2CH_2(CF_2CF_2)_nCF_2CF_3$, wherein n is 1–7;

polyoxyalkylene, including but not limited to —(CH$_2$CH$_2$O)$_m$H, —(CH$_2$CH$_2$CH$_2$O)$_m$H, —(CH$_2$CH$_2$O)$_m$R$^1$, or —(CH$_2$CH$_2$CH$_2$O)$_m$R$^1$ wherein m is 1–200; —C(R$^2$)$_2$R$^3$Y, wherein R$^3$ is alkylene or polyoxyalkylene (or a combination thereof), and Y is —OSO$_3$H, —SO$_3$H, —CO$_2$H, —PO$_3$H, —OPO$_3$H, or a salt thereof; CF$_3$(CF$_2$)$_q$- wherein q is 1–11, hexafluorobutyl, tetrafluoropropyl; sodium, potassium, lithium, ammonium, or quaternary amine; and v is 0, 1, or 2.

In a second embodiment, a textile processing or cleansing compound is included in the polymerization reaction, along with the acrylic acid or acrylic acid derivative and sulfonated aromatic compound.

The polymerization reaction components are selected based on the desired properties of the resulting polymeric product for a specific application. The choice of aromatic sulfonic acid or its salt and textile processing or cleansing agent will influence the aqueous solubility, wettability, ionic character, surfactant capability, exhaustibility, soil and grease absorption, chelation ability, flame retardancy, and detergency of the polymer.

Water soluble and water dispersible polymeric compositions for textile processing can be prepared by the appropriate selection of acrylic acid derivative monomers and aromatic sulfonic acid.

The resulting polymers have superior properties for use in textile processing and cleaning, and can be used as detergents, dye levelers, soil resist agents, surfactants, emulsifiers, yarn lubricants, copolymerizing agents, polymer after treat agents, finishing agents, leather tanning and finishing auxiliaries, defoamers, chelating agents, flocculants, anti-static agents, flame retardants, metal cleaners, metal coatings, and as multipurpose acids (replacing or supplementing, for example, phosphoric, acetic, formic, sulfonic, or sulfamic acid in a processing procedure).

The polymeric compositions disclosed herein can also be used generally as coatings for hard or soft surfaces, including wood, paper, stone, concrete, brick, masonery, glass, ceramic, porcelain, hard plastics and rubbers, marble, granite, other architectural building materials, metals, and composites.

DETAILED DESCRIPTION OF THE INVENTION

The term alkyl, as used herein, unless otherwise specified, refers to a saturated straight, branched, or cyclic hydrocarbon of C$_1$ to C$_{20}$, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, 2,3-dimethylbutyl, and 2-ethylhexyl, octyl, decyl, dodecyl, and stearyl.

The term alkylene, as used herein, and unless otherwise defined, refers to a divalent alkyl group of from C$_1$ to C$_{20}$.

The term alkenyl, as referred to herein, and unless otherwise specified, refers to a straight, branched, or cyclic (in the case of C$_{5-6}$) hydrocarbon of C$_2$ to C$_{20}$ with at least one double bond.

The term aliphatic refers to alkyl and alkenyl moieties.

The term aryl or aromatic, as used herein, and unless otherwise specified, refers to phenyl, substituted phenyl, naphthyl, or substituted naphthyl, wherein the substituent is halo, alkyl, hydroxyl, carboxyl, sulfonyl, or phosphoric acid, and wherein the aromatic ring can have 1, 2, 3, or 4 substituents.

The term halo, as used herein, includes fluoro, chloro, bromo, and iodo.

The term aralkyl refers to an aryl group with an alkyl substituent.

The term alkaryl refers to an alkyl group that has an aryl substituent.

The term polyoxyalkylene refers to a moiety that has a repeating unit of -(alkylene-O)-, wherein alkylene is a divalent alkyl group. Preferred alkylene groups in the polyoxyalkene are methylene, ethylene and propylene. The polyoxyalkylene can be terminated with a wide variety of moieties, including hydrogen and alkyl, for example, CH$_3$(CH$_2$)$_n$, wherein n is 0–30.

The term aromatic sulfonic acid or sulfonated aromatic compound refers to any aromatic compound in which a sulfonic acid group is covalently bound to an aromatic moiety, and for the purpose of this invention, does not include aromatic sulfonic acids with ethylenic unsaturation, for example, sulfonated styrene.

As used herein, the term polyacrylic acid includes polymers prepared by the polymerization of H$_2$C=CHCO$_2$X, H$_2$C=CR$^1$CO$_2$X, HR$^2$C=CHCO$_2$X, HR$^2$C=CR$^1$CO$_2$X, HR$^2$C=CHCOX, H$_2$C=CHCOX, H$_2$C=CR$^1$COX, H$^2$C=CR$^1$COX, H$_2$C=CHCSO$_v$X, HR$^2$C=CHCSO$_v$X, HR$^2$C=CR$^1$CSO$_v$X, H$_2$C=CR$^1$CSO$_v$X, H$_2$C=CHCON(R$^3$)$_2$, HR$^2$C=CHCON(R$^3$)$_2$, H$_2$C=CR$^1$CON(R$^3$)$_2$, or HR$^2$C=CR$^1$CON(R$^3$)$_2$, with X and R as defined above.

The term acrylic acid derivative, as used herein includes H$_2$C=CHCO$_2$X, H$_2$C=CR$^1$CO$_2$X, HR$^2$C=CHCO$_2$X, HR$^2$C=CR$^1$CO$_2$X, HR$^2$C=CHCOX, H$_2$C=CHCOX, H$_2$C=CR$^1$COX, HR$^2$C=CR$^1$COX, H$_2$C=CHCSO$_v$X, HR$^2$C=CHCSO$_v$X, HR$^2$C=CR$^1$CSO$_v$X, H$_2$C=CR$^1$CSO$_v$X, H$_2$C=CHCON(R$^3$)$_2$, HR$^2$C=CHCON(R$^3$)$_2$, H$_2$C=CR$^1$CON(R$^3$)$_2$, or HR$^2$C=CR$^1$CON(R$^3$)$_2$, with X and R as defined above.

Textile processing terms, as used herein, are defined as follows. Acid dye levelers are compounds that allow uniform distribution of a dye during the coloring process. If a leveler is not used, the dyestuff tends to adhere in a non-uniform fashion, causing blotching of the color and Barre'. Textile processing acids are compounds used to adjust the pH during dyebath and finishing treatments. Surfactants and emulsifiers are surface active agents that modify the surface energy between two liquid phases. A yarn lubricant is an oil or emulsion finish that is applied to a fiber to prevent damage to the fiber during textile processing or applied to knitting yarns to make them more pliable. A defoamer is a chemical that reduces the foamability of a solution. An antistatic agent is a reagent capable of preventing, reducing, or dissipating static electrical charge that is produced on materials. A flame retardant is a chemical that is incorporated into a textile fiber during manufacture or use to reduce flammability. Ultra-violet absorbers are chemicals that absorb ultra-violet radiation, and are used to protect the fiber from damage caused by uv absorption. A finishing agent is a chemical applied to a substrate for dimensional stability and other desired aesthetic effects.

In a preferred embodiment, acrylic acid based polymeric compositions are disclosed that are prepared by polymerizing H$_2$C=CHCO$_2$X, H$_2$C=CR$^1$CO$_2$X, HR$^2$C=CHCO$_2$X, HR$^2$C=CR$^1$CO$_2$X, HR$^2$C=CHCOX, H$_2$C=CHCOX, H$_2$C=CR$^1$COX, HR$^2$C=CR$^1$COX, H$_2$C=CHCSO$_v$X, HR$^2$C=CHCSO$_v$X, HR$^2$C=CR$^1$CSO$_v$X, H$_2$C=CR$^1$CSO$_v$X, H$_2$C=CHCON(R$^3$)$_2$, HR$^2$C=CHCON(R$^3$)$_2$, H$_2$C=CR$^1$CON(R$^3$)$_2$, or HR$^2$C=CR$^1$CON(R$^3$)$_2$, with X and R as defined above, or a combination thereof, in the presence of at least 10% by weight of the reaction components of an aromatic sulfonic acid or its salt, or a mixture of aromatic sulfonic acids.

An important advantage of the polymers described herein is that they can replace current textile processing and finishing chemicals that can have an unfavorable effect on the environment. For example, laundry detergents now commonly include phosphoric acid salts or their esters as surfactants. These compounds are very difficult to remove from wastewater and are often released into fresh water, where they accelerate the aging of rivers, streams, and lakes. In certain countries, phosphoric acid esters are being replaced with acrylic and methacrylic acid polymers. An alternative laundry detergent can be prepared as described herein by polymerizing an acrylic acid in the presence of a sulfonated aromatic compound and a phosphoric acid ester. The resulting laundry detergent retains the advantages of the phosphoric acid ester but is easily removed from wastewater using conventional wastewater treatment processes.

The polymers described herein can also be used in fiber finishing processes to replace or supplement the acid dye levelers, soil resist agents, surfactants, emulsifiers, and acids for pH adjustment that are now used. These compounds are eliminated in the waste stream, significantly increasing the biological oxygen demand (B.O.D.) and the chemical oxygen demand (C.O.D.) of the wastewater. The polymers described herein can be exhausted onto nylon fiber, wool, silk, or leather, so that they are not eliminated in the waste stream, thereby decreasing the B.O.D. and C.O.D. of the wastewater, and at the same time actually improving the physical properties and durability of the fiber.

The polymeric composition prepared using this method can optionally be provided as a salt. Nonlimiting examples are (a) base addition salts formed with metal cations such as sodium, potassium, zinc, calcium, magnesium, aluminum, and the like, or salts formed with nitrogenous compounds such as ammonium ion, quaternary amine, or ethylenediamine; or (b) acid addition salts formed with inorganic acids (for example, hydrochloric acid, hydrobromic acid, sulfuric acid, phosphoric acid, nitric acid, and the like); and salts formed with organic acids such as acetic acid, oxalic acid, tartaric acid, succinic acid, malic acid, ascorbic acid, benzoic acid, tannic acid, pamoic acid, alginic acid, polyglutamic acid, or aromatic sulfonic acids; or (c) combinations of (a) and (b).

The acrylic acid derivatives can be copolymerized with other ethylenic unsaturated monomers in the presence of the aromatic sulfonic acid. Such monomers include, for example, unsaturated monocarboxylic acids, unsaturated polycarboxylic acids and anhydrides; unsaturated substituted and unsubstituted esters and amides of carboxylic acids and anhydrides; nitriles; vinyl monomers; vinylidene monomers; monoolefinic and polyolefinic monomers; and unsaturated heterocyclic monomers.

Representative monomers include, for example, acrylic acid, $H_2C=CHC(O)NH(alkyl)SO_3^-Na^+$, itaconic acid, citraconic acid, aconitic acid, maleic acid, maleic anhydride, fumaric acid, crotonic acid, cinnamic acid, oleic acid, palmitic acid, vinyl sulfonic acid, vinyl phosphonic acid, alkyl or cycloalkyl esters of the foregoing acids, the alkyl or cycloalkyl groups having 1 to 18 carbon atoms such as, for example, ethyl, butyl, 2-ethylhexyl, octadecyl, 2-sulfoethyl, acetoxyethyl, cyanoethyl, hydroxyethyl and hydroxypropyl acrylates and methacrylates, and amides of the foregoing acids, such as, for example, acrylamide, methacrylamide, methylolacrylamide, and 1,1-dimethylsulfoethylacrylamide, acrylonitrile, methacrylonitrile, styrene, α-methylstyrene, p-hydroxystyrene, chlorostyrene, sulfostyrene, vinyl alcohol, N-vinyl pyrrolidone, vinyl acetate, vinyl chloride, vinyl ethers, vinyl sulfides, vinyl toluene, butadiene, isoprene, chloroprene, ethylene, isobutylene, vinylidene chloride, sulfated castor oil, sulfated sperm oil, sulfated soybean oil, and sulfonated dehydrated castor oil, and sulfonated marine oil. Particularly useful monomers include, for example, alkyl acrylates having 1–4 carbon atoms, itaconic acid, sodium sulfostyrene, and sulfated castor oil. Mixtures of the monomers, such as, for example, sodium sulfostyrene and styrene, and sulfated castor oil and acrylic acid, can be copolymerized with the methacrylic acid.

Methods to polymerize a monomer in the presence of a polymer are described in a number of sources, including U.S. Pat. No. 4,940,757 to Moss, incorporated by reference herein.

I. (α or β)-Substituted Acrylic Acid or Acrylic Acid

The polyacrylic acid resin is prepared by polymerizing $H_2C=CHCO_2X$, $H_2C=CR^1CO_2X$, $HR^2C=CHCO_2X$, $HR^2C=CR^1CO_2X$, $HR^2C=CHCOX$, $H_2C=CHCOX$, $H_2C=CR^1COX$, $HR^2C=CR^1COX$, $H_2C=CHCSO_vX$, $HR^2C=CHCSO_vX$, $HR^2C=CR^1CSO_vX$, $H_2C=CR^1CSO_vX$, $H_2C=CHCON(R^3)_2$, $HR^2C=CHCON(R^3)_2$, $H_2C=CR^1CON(R^3)_2$, or $HR^2C=CR^1CON(R^3)_2$, or a combination thereof, in the presence of an aromatic sulfonic acid or its salt, wherein:

$R^1$ and $R^2$ are independently an alkyl, alkenyl, aromatic, aralkyl or alkaryl moiety of $C_1$ to $C_{20}$ that is optionally substituted with one or more halogen; hydroxyl, sulfate, sulfonic acid, phosphoric acid, or carboxylic acid moieties (or the corresponding sulfonic, phosphoric or carboxylic acid esters), or a combination thereof;

$R^3$ is independently hydrogen or an alkyl, alkenyl, aromatic, aralkyl or alkaryl moiety of $C_1$ to $C_{20}$ that is optionally substituted with one or more halogen, hydroxyl, sulfate, sulfonic acid, phosphoric acid, or carboxylic acid moieties (or the corresponding sulfonic, phosphoric or carboxylic acid esters), or a combination thereof; and X is hydrogen, alkyl, alkenyl, aromatic, aralkyl or alkaryl moiety of $C_1$ to $C_{20}$ that is optionally substituted with one or more halogen, hydroxyl, carboxylic acid, phosphoric acid, or sulfonic acid moieties (or the alkyl ester thereof); $-CH_2CH_2(CF_2CF_2)_nCF_2CF_3$, wherein n is 1–7; polyoxyalkylene, including but not limited to $-(CH_2CH_2O)_mH$, $-(CH_2CH_2CH_2O)_mH$, $-(CH_2CH_2O)_mR$, or $-(CH_2CH_2CH_2O)_mR$ wherein m is 1–200; $-C(R^2)_2R^3Y$, wherein $R^3$ is alkylene or polyoxyalkylene (or a combination thereof), and Y is $-OSO_3H$, $-SO_3H$, $-CO_2H$, $-PO_3H$, $-OPO_3H$, or a salt thereof; $CF_3(CF_2)_q^-$ or $C_3(CF_2)_q^-$, wherein q is 1–11, and specifically including hexafluorobutyl and tetrafluoropropyl; sodium, potassium, lithium, ammonium, or quaternary amine; and v is 0, 1, or 2.

Mixtures of acrylic acid derivatives can also be reacted together. Esters of substituted acrylic acids can be polymerized in combination with unesterified substituted acrylic acids. If the alcohol from which the ester is prepared is hydrophobic, as the percentage of ester in the composition increases, water solubility and affinity for the polyamide fiber will decrease. If the alcohol from which the ester is prepared is hydrophilic or basic, water solubility is not adversely affected or is improved. Acrylic acid derivatives with low water solubility can be polymerized using emulsion polymerization techniques known to those skilled in the art.

In an alternative embodiment, an unhalogenated acrylic acid derivative, or acrylic acid, is copolymerized with a partially halogenated or perhalogenated acrylic acid or acrylate. A particularly useful monomer is $CH_2=C[H$ or $CH_3]$ $[(C(O)OCH_2CH_2R_f]$, wherein $R_f$ is $CF_3CF_2(CF_2CF_2)n$, and n=1–7. Monomers of this class are often sold as a mixture that contains a range of chain lengths in the $R_f$ moiety.

In another embodiment, fluorinated $C_3$–$C_{12}$ esters of acrylic acids are polymerized or copolymerized in the presence of the aromatic sulfonic acid. It is preferable for textile applications to copolymerize a fluorinated acrylate with at least some free acrylic acid. Fluorinated alkyl esters of acrylic acid have low water solubility. When polymerizing or copolymerizing these esters, an emulsifying agent such as a nonyl phenol, an ethoxylated oleic acid ester, or a sorbitan monooleate can be included in the reaction mixture.

It is sometimes desirable to include an alkyl acrylate or alkyl methacrylate in the polymerization reaction. The inclusion of these monomers in the polymerization reaction appears to assist in the formation of random, as opposed to block, copolymers. One example of a class of alkyl acrylates that is useful is $CH_2=C[H$ or $CH_3]$ $[(C(O)OZ]$, wherein Z is a polyoxyalkylene, including but not limited to —$(CH_2CH_2O)_mH$, —$(CH_2CH_2CH_2O)_mH$, —$(CH_2CH_2O)_mR^1$, or —$(CH_2CH_2CH_2O)_mR^1$ wherein m is 1–200.

It is often desired that textile processing agents be water soluble or water dispersible. One of ordinary skill in the art of acrylic acid polymerizations can easily choose a monomer mix, aromatic sulfonic acid, and optionally, textile processing compounds, that will provide a water soluble polymeric composition or a water stable polymeric dispersion. The term water soluble, as used herein, refers to a material that is soluble to the extent of at least approximately 10, and preferably, 15 or 20, grams per liter of water. The term water stable dispersion, as used herein, refers to a material that remains dispersed in water to the extent of at least approximately 10, and preferably, 15 or 20, grams per liter of water for a period of at least approximately 1 week at ambient temperature.

Water solubility or dispersibility can be enhanced by including an appropriate amount of a monomer in the polymerization reaction that contains free carboxylic acid, sulfonic acid, or phosphoric acid, or a salt thereof. One example is $CH_2=C[H$ or $CH_3]$ $[(C(O)OC(R^2)_2R^3Y]$, wherein $R^3$ is alkylene or polyoxyalkylene, and Y is —$SO_3H$, —$CO_2H$, or —$PO_4H$, or a salt thereof. Other examples include $CH_2=C(H)C(O)NHC(CH_3)_2CH_2SO_3^-$ $Na^+$ and $CH_2=C(CH_3)C(O)NHCH_2CH_2CH_2SO_3^-Na^+$.

If a portion of the acrylic acid derivatives used in the polymerization reaction does not include a free carboxylic acid, sulfonic acid, or phosphoric acid, or a salt thereof, an appropriate portion of the monomers should contain other hydrophilic moieties to impart adequate water solubility or dispersability to the polymer, including but not limited to hydroxyl and sulfonamide. Water solubility or dispersibility can also be enhanced by the proper choice of initiating agent. In general, persulfates increase both water solubility and dispersibility.

It is desirable to include an alpha-substituted acrylic acid, and in particular, methacrylic acid, in polymeric composition for use as acid dye levelers and soil resist agents. These monomers increase to substantivity of the polymeric composition for the fiber. They also increase the hardness of the polymer film on the fiber.

II. Aromatic Sulfonic Acids and their Salts

Aromatic sulfonic acids are included in the acrylic acid polymerization reaction to impart a number of characteristics to the polymer, including, but not limited to, anionic character (when in the salt form), acidity when used as the free acid, viscosity adjustment, prevention of precipitation and clumping, hydrotropic effects, and increased exhaustibility. The aromatic sulfonic acids also impart reaction stability, and solubility or emulsification, as appropriate.

Nonlimiting examples of aromatic sulfonic acids include xylene sulfonic acid, toluene sulfonic acid, benzene sulfonic acid, cumene sulfonic acid, dodecylbenzene sulfonic acid, dodecyl diphenyloxide disulfonic acid, sulfonated dihydroxydiphenylsulfone (sulfonated DDS), naphthalene sulfonic acid, benzaldehyde sulfonic acid, methylnaphthalene sulfonic acid, trimethylbenzenesulfonic acid, aminobenzene sulfonic acid, halobenzenesulfonic acid, alkoxybenzenesulfonic acid, benzophenone sulfonic acid, benzophenone disulfonic acid, halonaphthalene sulfonic acid, alkylnaphthalene sulfonic acid, alkoxynaphthalene sulfonic acid, carboxybenzene sulfonic acid (3-sulfobenzoic acid), hydroxybenzenesulfonic acid, hydroxynapthalenesulfonic acid, carboxymethylbenzene sulfonic acid, alkylbenzene disulfonic acid, dicarboxybenzene sulfonic acid, acetamidobenzene sulfonic acid, acetaminonaphthalene sulfonic acid, naphthalene disulfonic acid, alkyl naphthalene disulfonic acid, dialkylbenzene disulfonic acid, biphenyl-4,4'-disulfonic acid, benzene and naphthalene sulfonic acids that contain combinations of halo, alkyl, hydroxy, carboxy, alkoxy, and acetamino groups, as well as the salts of all of these compounds. Preferred salt cations are sodium, potassium, and ammonium. Examples of aromatic sulfonic acid salts include sodium xylene sulfonate, ammonium xylene sulfonate, sodium toluene sulfonate, sodium cumene sulfonate, ammonium cumene sulfonate, potassium toluene sulfonate, potassium cumene sulfonate, and potassium xylene sulfonate.

The choice of aromatic sulfonic acid to be included in the acrylic acid polymerization reaction will be determined by a variety of factors, including aqueous or organic solubility, degree of sulfonation, viscosity, solidification temperature, and pH. One of skill in the art will know how to select the appropriate aromatic sulfonic acid based on known properties of these compounds. Mixtures of sulfonated aromatic compounds, including salts, can be used to attain the desired properties. Diphenyl esters or diphenyl oxide disulfonates are preferred for use in levelers. Xylene sulfonic acids are preferred for use in exhaustible acids. Dodecylbenzene sulfonic acids are preferred for use in shampoos and detergents.

III. Textile Processing or Cleansing Compounds

A wide variety of textile processing and cleansing compounds can be included in the acrylic acid polymerization reaction to improve the properties of the polymeric composition. Examples of the families of chemicals that can be included are described in more detail below.

A. Surfactants

As noted above, polymers prepared by the polymerization of acrylic acid in the presence of an aromatic sulfonic acid and a surfactant can be used in a wide variety of applications, including as acid dye levelers, pH adjusters, in shampoos and detergents, as defoamers, yarn lubricants, and in metal cleaners and coatings. The polymer can be exhausted onto fibers with terminal protonated amino groups, such as nylon, during textile treatment processes, to reduce the concentration of the polymeric material in the wastewater, thereby reducing the B.O.D. and C.O.D. (biological oxygen demand and carbon oxygen demand, respectively) of the effluent.

Surfactants contain both a hydrophobic (or lyophobic) end and a hydrophilic (or lyophilic) end. Surfactants are typically characterized by the nature of its hydrophilic portion. Anionic surfactants have a negatively charged moiety in the hydrophilic end of the molecule, such as a carboxylate or sulfonate salt. Cationic surfactants have a positive charge in the hydrophilic portion of the molecule, provided by, for example, an ammonium salt or a quaternary amine. A zwitterionic surfactant has both positive and negative charges in the hydrophilic portion. Examples of zwitterions are long chain amino acids and sulfobetaines. Nonionic surfactants do not have a formalized charge. Examples include the monoglycerides of long chain fatty acids and polyoxyethylenated alkyl phenol.

The hydrophobic end of the surfactant can include a wide variety of structures, for example, straight or branched long chain alkyl groups, long chain alkyl benzenes, alkyl naphthalenes, rosins, high molecular weight propylene oxide polymers, long chain perfluoroalkyl groups, polysiloxane groups and lignin derivatives. In general, as the length of the hydrophobic group increases, solubility in polar or ionic solvents decreases. Branching and unsaturation typically increases the solubility of the surfactant in all solvents. Aromatic nuclei increase adsorption onto polar surfaces. Polyoxypropylene chains also increase adsorption onto polar surfaces, and increase solubility in organic solvents. Perfluoroalkyl and polysiloxane moieties are hydrophobic groups that reduce the surface tension of water to lower values than those attainable with a hydrocarbon-based hydrophobic group. Perfluoroalkyl surfaces are both water and hydrocarbon repellent.

The characteristics of surfactants and their applicability for a wide variety of applications are described by Rosen in *Surfactants and Interfacial Phenomena*, 2nd Edition (John Wiley and Sons, NY), incorporated herein by reference. In general, the desired chemical structures of the hydrophilic and hydrophobic portions of the surfactant will vary with the nature of the solvent and the conditions of use. As discussed by Rosen, in a highly polar solvent such as water, the hydrophobic group can be, for example, a hydrocarbon, fluorocarbon or siloxane chain of proper length, whereas in a less polar solvent such as an alcohol, a very nonpolar moiety is required in the hydrophobic part of the surfactant. If a surface is to be made hydrophobic by the use of a surfactant, a cationic surfactant is usually preferred. If a surface is to be made hydrophilic, in general, then anionic surfactants should be considered. Nonionic surfactants adsorb onto surfaces with either the hydrophilic or hydrophobic group oriented toward the surface, depending on the nature of the surface.

It is important to understand that surfactant activity in a particular system is highly dependent on the nature of the two immiscible materials. The surfactant must have a chemical structure that is amphipatic in that solvent system. Methods to select and manipulate the surfactant for a given system are well known to those of skill in the art, and are described in a large number of textbooks, for example, *Surfactants and Interfacial Phenomena*.

Families of surfactants are also well known to those skilled in the art, and can be used with the polymers described herein. Common ionic surfactant families include sodium and potassium salts of straight chain fatty acids (soaps), sodium and potassium salts of coconut oil fatty acids, sodium and potassium salts of tall oil acids, amine salts, acylated polypeptides, linear alkylbenzene sulfonates, higher alkyl benzene sulfonates, aromatic sulfonates, petroleum sulfonates, paraffin sulfonates (secondary n-alkanesulfonates), olefin sulfonates, sulfosuccinate esters, alkylnaphthylsulfonates, isethioates, sulfuric acid ester salts, including sulfated linear primary alcohols, sulfated polyoxyethylenated straight chain alcohols, sulfated triglyceride oils, phosphoric and polyphosphoric acid esters, perfluorinated anionics, long chain amines and their salts, diamines and polyamines and their salts, quaternary ammonium salts, polyoxyethylenated long-chain amines, quaternized polyoxyethylenated long chain amines, and amine oxides.

Common nonionic surfactants include polyoxyethylenated alkylphenols, alkyl phenol ethoxylates (such as the polyoxyethylenated derivatives of nonylphenol, octyl phenol, and dodecylphenol), alcohol ethoxylates, polyethylenated polypropylene glycols, polyoxyethylenated polyoxypropylene glycol, polyoxyethylenated mercaptans, long chain carboxylic acid esters, glycerol and polyglycerol esters of natural fatty acids, propylene glycol, sorbitol, and polyoxyethylenated sorbitol esters, polyoxyethylene glycol esters and polyoxyethylenated fatty acids, alkanolamine condensates, alkanolamides, alkanolamine fatty acid condensates, tertiary acetylenic glycols, polyoxyethylenated silicones, N-alkylpyrrolidones, and alkylpolyglycosides.

Common zwitterionic surfactants include β-N-alkylaminopropionic acid, N-alkyl-β-iminodipropionic acids, imidazolidine carboxylates, N-alkylbetaines, amine oxides, sulfobetaines and sultaines.

Preferred surfactants include polyethylene glycols, phenol ethoxylates, ethoxylated alcohols, and phosphoric acid esters. These families of compounds are discussed in more detail below.

1. Ethylene Glycol Esters and Polyethylene Glycols

Ethylene glycol esters, ethylene glycols and polyethylene glycols can be used in the preparation of acrylic acid resins to be used as surfactants, emulsifiers, and lubricants (i.e., detergent builders).

Ethylene glycol can be in the form of a mono or diester, for example, ethylene glycol monomethyl ether, ethylene glycol dimethyl ether, ethylene glycol monoethyl ether, ethylene glycol diethyl ether, ethylene glycol (mono or di)-isopropyl ether, ethylene glycol (mono or di)-n-propyl ether, ethylene glycol (mono or di)-n-butyl ether, ethylene glycol (mono or di)-sec-butyl ether, and ethylene glycol (mono or di)-isobutyl ether. Also appropriate are the mono- and di- alkyl ethers of diethylene glycol.

Polyethylene glycols (referred to as "PEG") can be purchased from any of several commercial sources in molecular weights ranging from 100 to 6,000. Polypropylene glycols are also available from a number of sources.

2. Phenol Ethoxylates

Long chain alkyl phenol ethoxylates are known surfactants. These compounds can be added to the acrylic acid polymerization reaction to form a polymer that can be used as an exhaustible surfactant or emulsifier, exhaustible acid dye leveler, liquid laundry detergent, or liquid detergent additive. A commonly used phenol ethoxylate is nonylphenol ethoxylate, which is commercially available having a wide range of ethoxylation, including 4 mole, 6 mole, 9 mole, 15 mole, and 30 mole. All of these are suitable for incorporation into the acrylic acid resins. Various types of ethoxylated octylphenol and dodecylphenol are also commercially available. Combinations of long chain alkyl phenol ethoxylates are also suitable.

The greater the extent of ethoxylation of the long chain phenol ethoxylate, the higher its water solubility. Therefore, phenol ethoxylates with high ethoxylation values should be used in the acrylic acid polymerization reaction when a product is desired that has high wettability or aqueous solubility. In contrast, a phenol ethoxylate with a low ethoxylation value should be used to prepare a product with low solubility and high exhaustibility. For example, a nonyl phenol with a low extent of ethoxylation is suitable for inclusion in a product used as a defoamer, in which low solubility is an important factor.

3. Ethoxylated Alcohols

Ethoxylated alcohols can be included in the acrylic acid polymerization process to provide a product that is useful as a surfactant, emulsifier, low foam detergent or wetting agent. Preferred compounds are ethoxylated decyl alcohol and tridecyl alcohol. These compounds are commercially available with ethoxylation values of approximately 4 mole, 6 mole, 8.5 mole, 9 mole, 12 mole, 15 mole, and 30 mole. Decyl alcohols are preferred for use as low temperature surfactants and tridecyl alcohols are preferred for use as high temperature surfactants.

B. Perfluoroalkylethyl and Perfluorinated Alcohols

A perfluoroalkylethyl alcohol can be included as desired in the reaction mixture. Perfluoroalkylethyl and perfluorinated alcohols assist in the solubilization of perfluoroalkylethyl acrylates and methacrylates in the reaction mixture. They can also act as chain terminating agents in the polymerization reaction. An example of a perfluoroalkylethyl alcohol is $HOCH_2CH_2R_f$, wherein $R_f$ is $(CF_2CF_2)_nCF_2CF_3$, and n is 1–7. This class of alcohols is often bought as a mixture of $R_f$ values. A preferred mix is approximately 40% n=2, approximately 30% n=3, approximately 20% n=4, approximately 10% n=5, and little n=1, 6, and 7. In an alternative embodiment, additional nonfluorinated alkyl carbons, or alternatively, polyoxyalkylene, can be placed between the hydroxyl function and $R_f$, e.g., $HOCH_2(CF_2CF_2)_nCF_2CF_3$, $HOCH_2CH_2CH_2(CF_2CF_2)_nCF_2CF_3$, $HOCH_2CH_2CH_2CH_2(CF_2CF_2)_nCF_2CF_3$, and $HOCF_2CF_2(CF_2CF_2)_n$—$CH_2CH_2CH_2O$—$(CH_2CH_2O)_m(H$ or alkyl).

Suitable perfluorinated alcohols are also of the formula $CF_3(CF_2)_qOH$, wherein q is 1–11, and also hexafluorobutyl and tetrafluoropropyl alcohol.

C. Perfluoroalkylethyl Amines

A perfluoroalkylethyl amine can also be included in the reaction mixture as desired. An example of a perfluoroalkylethyl amine is $H_2NCH_2CH_2R_f$, wherein $R_f$ is $(CF_2CF_2)_nCF_2CF_3$, and n is 1–7. This class of amines is often bought as a mixture of $R_f$ values. A preferred mix is approximately 40% n=2, approximately 30% n=3, approximately 20% n=4, approximately 10% n=5, and little n=1, 6, and 7. In an alternative embodiment, additional nonfluorinated alkyl carbons, or alternatively, polyoxyalkylene, can be placed between the amine function and $R_f$, e.g., $H_2NCH_2(CF_2CF_2)_nCF_2CF_3$, $H_2NCH_2CH_2CH_2(CF_2CF_2)_nCF_2CF_3$, $H_2NCH_2CH_2CH_2CH_2(CF_2CF_2)_nCF_2CF_3$, and $H_2NCF_2CF_2(CF_2CF_2)_n$—$CH_2CH_2CH_2O$—$(CH_2CH_2O)_m(H$ or alkyl).

D. Phosphoric Acid Derivatives

Phosphoric acid and its salts, as well as phosphoric acid esters and their salts, can be included in the acrylic acid polymerization reaction to provide a product that is a superior chelating agent, flocculant, flame retardant, metal cleaner, anti-static agent, emulsifying agent (for example, in pesticides, herbicides, and in liquid fertilizer), dry cleaning solution, or hydrotrope. Preferred phosphoric acid esters are phosphated polyoxyethylenated alcohols (acid or salt), phosphated polyoxyethylenated phenols (acid or salt), and sodium alkyl phosphates. A preferred phosphoric acid ester is 2-ethylhexyl phosphoric acid. Any cation can be used to form the salt, including sodium, potassium, ammonium, substituted ammonium, and quaternary amine. Other suitable phosphoric acid esters include phosphated decyl alcohol with ethoxylation values of 4 and 6 mole for use as flame retardants and antistatic agents.

E. Ultra-Violet Absorbing Agents

Ultra-violet absorbing agents can be included in the acrylic acid polymerization reaction to provide a product that provides a protective coating against ultra-violet radiation. Any aromatic ultra-violet absorbing molecule is suitable. Examples include 2,4-dihydroxy-benzophenone (Uvinol™-400, BASF Corporation), 2-hydroxy-4-methoxy-benzophenone (Uvinol™ M-40, BASF Corporation), 2,2'-dihydroxy-4,4'-dimethoxybenzophenone (Uvinol™ D-49, BASF Corporation), Uvinol™ 490 (BASF Corporation, mixture of Uvinol™ D-49 and other tetrasubstituted benzophenones), 2,2',4,4'-tetrahydroxybenzophenone (Uvinol™ D-50), 2-hydroxy-4-methoxy-benzophenone-5-sulfonic acid (Uvinol™ MS-40), disodium 2,2'-dihydroxy-4,4'-dimethoxy-5,5'-disulfobenzophenone (Uvinol™ DS-49), ethyl-2-cyano-3,3-diphenylacrylate (Uvinol™ N-35), 2-ethylhexyl-2-cyano-3,3-diphenylacrylate (Uvinol™ N-539), and 4-methoxy-5-hydroxybenzophenone-3-sulfonic acid.

In an alternative embodiment, para-aminobenzoic acid be reacted with acrylic acid or methacrylic acid to form a (meth) acrylamide, that is used as a monomer in the polymerization reactions described herein.

Fluorochemicals are also useful with the polymers described herein. A number of compositions are commercially available and known to those skilled in the art. Fluorochemical coatings have been developed that prevent wetting of the textile surface, by minimizing chemical contact between of the textile surface, and substances that can stain the textile, making the substance easier to remove. Typical fluorochemicals contain a perfluoroalkyl radical having three to twenty carbons, and are produced by condensation of a fluorinated alcohol or fluorinated primary amine with a suitable anhydride or isocyanate, for example, N-ethyl perfluorooctyl-sulfonamidoethanol and toluene diisocyanate reacted in a 2:1 molar ratio.

Examples of commercially available fluorochemical coatings include Scotchgard™ 358 and 351 (Minnesota Mining & Mfg. Co.) and Teflon™ (E. I. DuPont Nemours & Co.). U.S. Pat. No. 4,518,649 to Wang, et al., discloses releasing finishes for textiles. A number of water and soil repellents for fabrics are reviewed by Sodano in Chemical Technology Review No. 134, Noyes Data Corporation, Park Ridge, N.J. 1979. European patent application by Allied Corporation describes an oil and soil repellent finish based on a mixture of a quaternary ammonium salt containing trialkyl dodecyl ammonium anion and cocoatrialkyl ammonium anion and a fluorochemical consisting of polycarboxybenzene esterified with fluorinated alcohols. British patent numbers 1,379,926 and 1,405,268 to Ciba-Geigy report several fluorocarbons useful for treatment of fibers to increase oil and water resistance.

F. Examples of Combinations of Reaction Components.

A wide variety of textile processing agents can be prepared by polymerizing $H_2C$=$CHCO_2X$, $H_2C$=$CR^1CO_2X$, $HR^2C$=$CHCO_2X$, $HR^2C$=$CR^1CO_2X$, $HR^2C$=$CHCOX$, $H_2C$=$CHCOX$, $H_2C$=$CR^1COX$, $HR^2C$=$CR^1COX$, $H_2C$=$CHCSO_yX$, $HR^2C$=$CHCSO_yX$, $HR^2C$=$CR^1CSO_yX$, $H_2C$=$CR^1CSO_yX$, $H_2C$=$CHCON(R^3)_2$, $HR^2C$=$CHCON(R^3)_2$, $H_2C$=$CR^1CON(R^3)_2$, or $HR^2C$=$CR^1CON(R^3)_2$, or a combination thereof, in the presence of an aromatic sulfonic acid or its salt, and optionally, one or more of the textile processing compound described above. All of these variations are intended to fall within the scope of the invention. Nonlimiting general examples of a few illustrative combinations of reactants are provided below.

Composition A

Component 1. perfluoroalkylethyl acrylate or methacrylate, or a mixture thereof, perfluoroalkylethylamidoacrylate or methacrylate, or perfluoroalkylethylsulfonyl aminopropenoate;

Component 2. perfluoroalkylethyl alcohol, perfluoroalkylethylamine, perfluoroalkylsulfate, perfluoroalkylethoxylate, or perfluoroalkylphosphate;

Component 3. alkyl acrylate, alkyl methacrylate, aryl acrylate, aryl methacrylate, alkaryl acrylate, or alkaryl methacrylate, or a mixture thereof;

Component 4. $H_2C=CHCO_2X$ or $H_2C=CR^1CO_2X$;

Component 5. aromatic sulfonic acid, for example aryl sulfonate, alkaryl sulfonate, or alkyl diphenyloxide sulfonate, alkyl sulfonate, alkylethoxy sulfate, or sodium lauryl ether sulfate;

Component 6. polymerization initiator; and

Component 7. water.

Composition B

Component 1. perfluoroalkylethylacrylates or methacrylates or a mixture thereof ($CH_2=C[H$ or $CH_3]$ [$(C(O)OCH_2CH_2R_f$], wherein $R_f$ is $CF_3CF_2(CF_2CF_2)n$, and n=1–7); perfluoroalkylethyl alcohol ($HOCH_2CH_2R_f$, wherein $R_f$ is $CF_2CF_2)_nCF_2CF_3$, and n is 1–7);

Component 2. acrylic acid or methacrylic acid, or a mixture thereof;

Component 3. alkylacrylate or methacrylate ($CH_2=C[H$ or $CH_3]$ [$(C(O)OZ]$, wherein Z is a polyoxyalkylene, including but not limited to —$(CH_2CH_2O)_mH$, —$(CH_2CH_2CH_2O)_mH$, —$(CH_2CH_2O)_mR$, or —$(CH_2CH_2CH_2O)_mR$ wherein m is 1–200);

Component 4. aromatic sulfonic acid;

Component 5. an anionic or nonionic surfactant, or combination thereof; and,

Component 6. a persulfate initiator in water.

Composition C

To the reaction components in Composition B. is added an acrylic acid derivative of the formula $CH_2=C[H$ or $CH_3]$ [$(C(O)OC(R^2)_2R^3Y]$, wherein $R^3$ is alkylene or polyoxyalkylene, and Y is —$SO_3H$, —$CO_2H$, or —$PO_4H$, or a salt thereof.

Composition D

To the reaction components in Composition B. is added an acrylic acid derivative of the formula $CH_2=C(H)C(O)NHC(CH_3)_2CH_2SO_3{}^{31}Na^+$ or $CH_2=C(CH_3)C(O)NHCH_2CH_2CH_2SO_3{}^-Na^+$.

V. Preparation of the Polymer

The reaction mixture typically contains at least $H_2C=CHCO_2X$, $H_2C=CR^1CO_2X$, $HR^2C=CHCO_2X$, $HR^2C=CR^1CO_2X$, $HR^2C=CHCOX$, $H_2C=CHCOX$, $H_2C=CR^1COX$, $HR^2C=CR^1COX$, $H_2C=CHCSO_vX$, $HR^2C=CHCSO_vX$, $HR^2C=CR^1CSO_vX$, $H_2C=CR^1CSO_vX$, $H_2C=CHCON(R^3)_2$, $HR^2C=CHCON(R^3)_2$, $H_2C=CR^1CON(R^3)_2$, or $HR^2C=CR^1CON(R^3)_2$, or a combination thereof, an aromatic sulfonic acid, a free radical initiating agent, and water. A textile processing or cleansing chemical as defined above should be added as appropriate to produce a polymeric composition with the desired characteristics. Any ratio of components is suitable that provides a product with the desired properties. One of ordinary skill in the art can easily manipulate the ratio of components to determine the best mix for a given application without undue experimentation.

Table 1 provides a typical range of percentages by weight for the reaction components. It should be understood that these ranges are not limitations, but exemplary, and superior products for certain applications can be formulated using the components described herein at concentrations other than in these ranges.

In a preferred embodiment, the aromatic sulfonic acid is present in an amount of at least approximately 10% by weight of all of the reaction components in the reaction mixture (including water).

TABLE 1

Ranges of Percent Composition for Polymeric Mixtures of Acrylic Acids and Aromatic Sulfonic Acids.

| Component | Percent Composition by weight |
|---|---|
| acrylic acid | 15–22 |
| free radical initiating agent | 3–5 |
| water | remaining percentage |
| aromatic sulfonic acid or its salts | 10–40 |
| textile processing chemical | 0–40 |
| ethylene glycol ester | |
| ethylene glycol | |
| polyethylene glycol | |
| ethoxylated phenol | |
| ethoxylated alcohol | |
| phosphoric acid/ester | |
| UV absorbing agents | |
| fluorinated alkyl ethyl alcohol and unsaturated esters, fluorinated alkyl ethyl amine and unsaturated amides | |
| fluorochemicals | |

In general, as the ratio of sulfonated aromatic compound increases, the molecular weight of the resulting polymer decreases, since the sulfonated aromatic compound acts as a chain terminating reagent for the acrylic acid polymerization. Polymers of lower molecular weight are desirable for exhaustible textile treatments because they tend to penetrate the shank of the polyamide fiber more easily than high molecular weight polymers. Polymers of higher molecular weight give good exhaustion and high substrate surface concentration.

Any known free radical initiating agent can be used to initiate the acrylic acid polymerization reaction, including sodium persulfate, potassium persulfate, ammonium persulfate, benzoyl peroxide, hydrogen peroxide, sodium peroxide, acetyl peroxide, lauryl peroxide, azobisisobutyronitrile, t-butyl peracetate, cumyl peroxide, t-butyl peroxide, and t-butyl hydroperoxide. Persulfate initiators increase the water solubility of the polymeric composition.

The appropriate weight percent of free radical agent to be used in the polymerization reaction will be a function of the molecular weight of the initiator. In general, the amount of initiator needed for polymerization increases as the percent of monomer in the reaction solution increases. However, in a concentrated reaction solution, the need to use a substantial amount of initiator must be balanced against the tendency of high quantities of initiator to actually decrease molecular weight and viscosity. Typically, the weight of the initiator used is approximately 15–30% that of the weight of the monomer, but the optimal amount can be determined in a given reaction by routine experimentation.

In a preferred embodiment, all reaction components are mixed and heated to a temperature ranging from approximately 50° C. to 100° C., depending on the temperature required for free radical generation of the initiator. The initiation of polymerization is sufficiently exothermic to raise the temperature of solution to between 100° and 115° C. The heat of reaction is controlled by reflux. The reaction temperature is allowed to stabilize, and then maintained at 100° C. for at least 30 minutes. Preferably, polymerization is allowed to proceed until one percent or less monomer is left in the reaction solution. The thickness of the reaction mixture, or tendency to gel, can be adjusted by increasing the ratio of sulfonated aromatic compound in the reaction mixture.

Once the reaction is complete, the reacted material is diluted to the desired solids concentration and viscosity, based on cost of product, effective concentration, and ease of handling. A wide variety of viscosity adjusting reagents can be used, including water and sulfonated aromatic acid or salt solutions. Preferred viscosity adjusting reagents include water, and the sodium, potassium, and ammonium salts of xylene sulfonate, cumene sulfonate, toluene sulfonate, and dodecyldiphenyl disulfonate. The resulting polymeric solution is acidic. If desired, the pH of the solution can be adjusted with a base such as ammonium, sodium, lithium, or potassium hydroxide, or amines such as triethanolamine. The reaction can be performed in one batch or by dose feed. In a dose feed process, the reaction is started by adding a percentage of the starting material to the reactor, and heating to initiate reaction. After the reaction creates an exotherm, additional reactants are added. The dose feed process can be used to control the vigorous nature of the reaction. As an example, one-third to one-half of the starting materials is added to the reactor. After the solution boils, one-third of the remaining material is added. The final two-thirds of the remaining material is added in at a rate so as not to reduce the reaction temperature below the initiation temperature.

V. Application and Use of the Polymer

The following examples provide representative formulations for a wide variety of textile applications. The ratios of reactants in these formulations can be modified as necessary by one skilled in the art to optimize a product for a specific use. Other components can also be added as required without altering the scope of the polymeric composition described herein. These formulations are merely illustrative of the types of products that can be prepared by using the method described herein, and are not intended to limit the scope of the invention. All percentages are by weight unless otherwise specified.

EXAMPLE 1

Preparation of a Tanning Agent for Leather

A superior tanning agent for leather was prepared by blending and reacting, in order:

| | |
|---|---|
| Water | 38.0% |
| Sodium Xylene Sulfonate | 30.0% |
| Xylene Sulfonic Acid | 10.0% |
| Ammonium Persulfate | 4.0% |
| Methacrylic Acid | 18.0% |

The product mixture had an active solids content of approximately 39%. The product was diluted to approximately 20% active solids before use with a mixture of water and sodium xylene sulfonate.

EXAMPLE 2

Preparation of a Surfactant

An exhaustible surfactant was prepared by blending and reacting:

| | |
|---|---|
| Methacrylic acid | 15.0% |
| Sodium cumene sulfonate | 30.0% |
| Ammonium persulfate | 5.0% |
| Nonyl phenol ethoxylated (9 mole) | 20.0% |
| Water | 30.0% |

The product had an active solids content of approximately 51%. It was diluted to a 45% active solids content with sodium cumene sulfonate and water.

EXAMPLE 3

Preparation of an Exhaustible Acid

An exhaustible acid was prepared by blending and reacting:

| | |
|---|---|
| Methacrylic Acid Monomer | 22.0% |
| Xylene sulfonic acid | 33.0% |
| Ammonium persulfate | 3.0% |
| water | 62.0% |

The product had an active solids content of approximately 55%. It was diluted before use to a 35.5% active solids content with water and sulfamic acid.

EXAMPLE 4

Preparation of an Exhaustible Acid

An alternative formulation for an exhaustible acid is:

| | |
|---|---|
| Methacrylic Acid Monomer | 16.0% |
| Xylene sulfonic acid | 20.0% |
| Ammonium persulfate | 4.0% |
| Water | 60.0% |

The reaction was performed as described in Example 3. The reacted product was diluted with 2:1 water to xylene sulfonic acid.

EXAMPLE 5

Preparation of an Exhaustible Acid

An alternative formulation for an exhaustible acid is:

| | |
|---|---|
| Methacrylic Acid Monomer | 28.0% |
| Xylene sulfonic acid | 30.0% |
| Ammonium persulfate | 5.0% |
| Water | 37.0% |

The reaction was performed as described in Example 3. 500 ml of product solution was diluted to 748 ml by the addition of 200 ml of water and 30 grams of powdered sulfamic acid. To this was added 18 ml of dodecylbenzenesulfonic acid to form the final product.

EXAMPLE 6

Preparation of an Exhaustible Shampoo

An exhaustible shampoo that does not diminish the soil and stain characteristics of nylon carpets was prepared by reacting:

| | |
|---|---|
| Methacrylic acid | 12.5% |
| Acrylic Acid | 12.5% |
| Xylene sulfonic acid | 8.0% |
| Sodium xylene sulfonate | 17.5% |
| Ammonium persulfate | 3.0% |
| Isopropyl alcohol | 4.5% |
| Water | 21.5% |
| Sodium dodecyl benzene sulfonate | 20.5% |
| | 100.0% |
| Dilution & Neutralization | |
| Reaction Product | 62.5% |
| Sodium xylene sulfonate | 13.5% |
| Water | 17.0% |
| NaOH 50% | 7.0% |
| | 100.0% |

Final product 38% solids, and pH 5.

EXAMPLE 7

Preparation of a Powder or Liquid Detergent

A powder or liquid laundry detergent or builder was prepared by reacting a mixture of:

| | |
|---|---|
| Acrylic acid | 18% |
| Xylene sulfonic acid | 5% |
| Ammonium Persulfate | 4% |
| Sodium cumene sulfonate | 23% |
| Water | 30% |
| Nonylphenol (9 mole ethoxylate) | 20% |
| | 100% |

The product is spray dried to be used as a powder or used as is in the liquid state as a liquid laundry product. The product functions as both a detergent and a detergent builder. It can also serve the function of surfactant, hydrotrope, soil absorber, or redeposition agent.

EXAMPLE 8

Preparation of a Hard Plastic Material

A hard plastic material is prepared by mixing and heating to 80° C. all of the components listed in Formulation A or B below except methacrylic acid, and then adding the methacrylic acid to the heated components. After the reaction is completed and the water is driven off, the product can be hot pressed or molded to a desired shape. Methyl methacrylate, acrylic acid, or another acrylic acid derivative described in Section II, can be substituted for methacrylic acid.

| | |
|---|---|
| Formulation A: | |
| Ammonium Persulfate | 3% |
| Methacrylate acid | 18% |
| Xylene Sulfonic Acid | 5% |
| Sodium Xylene Sulfonate | 10% |
| Phosphoric Acid (75%) | 20% |
| Water | 44% |
| | 100% |
| Formulation B: | |
| Ammonium Persulfate | 3% |
| Methacrylate acid | 18% |
| Xylene Sulfonic Acid | 5% |
| Sodium Xylene Sulfonate | 10% |
| Sulfamic Acid (powder) | 20% |
| Water | 44% |
| | 100% |

EXAMPLE 9

Preparation of an Exhaustible Surfactant or Acid Dye Leveler

An acrylic acid resin that is useful as an exhaustible surfactant or exhaustible acid dye leveler was prepared by reacting:

| | |
|---|---|
| Water | 30% |
| Sodium cumene sulfonate (45%) | 30% |
| Nonyl phenol (9 M) | 20% |
| Methacrylate acid | 15% |
| Ammonium Persulfate | 5% |
| | 100% |

The product made from this formulation had a solids content of approximately 51%. The solids content was diluted to approximately 45% with water. This product can be used instead of standard wetting agents and dye levelers in textile applications to reduce the B.O.D. and C.O.D. of the wastewater. It can also be used as a surfactant for liquid laundry detergent and dishwashing detergents, as well as an emulsifying agent for yarn lubricants. The product forms a stable emulsion when poured in water at a pH from pH 4.3 to pH 12. This formulation can also be used as an industrial wetting agent for synthetic and natural fibers, particularly cotton.

EXAMPLE 10

Preparation of an Acid Dye Leveler

An acid dye leveler was prepared by reacting:

| | |
|---|---|
| Sodium cumene sulfonate (40%) | 60% |
| Isopropyl alcohol | 7% |
| Dodecyl diphenyloxide disulfonate | 10% |
| Methacrylate acid | 15% |
| Xylene sulfonic acid | 4% |
| Ammonium persulfate | 4% |
| | 100% |

500 milliters of the reaction mixture was diluted to 640 ml with water to provide the final product.

EXAMPLE 11

Preparation of a Yarn Lubricant

A yarn lubricant was prepared by reacting:

| | |
|---|---|
| Methacrylate acid | 15% |
| Hydrogen peroxide (35%) | 6% |
| Water | 54% |
| Polyethylene glycol 400 | 20% |
| Xylene sulfonate acid | 5% |
| | 100% |

EXAMPLE 12

Preparation of a Copolymerizing Solution

A copolymerizing solution is prepared using the stain resistant composition described in U.S. Pat. No. 5,061,763, which is the reaction product of methacrylic acid and the formaldehyde condensation polymer of sodium naphthalene sulfonate and 4,4'-dihydroxydiphenylsulfone. Glacial methacylic acid (99% in water, 22.3 grams), water (48.7 grams), formaldehyde condensation polymer of sodium naphthalene sulfonate and 4,4'-dihydroxydiphenylsulfone (Erinal™ NW-LQ; 37–40% solution; 12.3 grams), potassium persulfate (5.7 grams), and sodium xylene sulfonate (40% solution; 11.0 grams) were placed in a two liter round bottom flask equipped with a mechanical stirrer, reflux condenser, thermometer, and water bath. The brownish solution was heated to 65° C. with stirring. A large exothermic reaction rapidly raised the temperature of the reaction mixture to 100° C. The temperature was maintained at 90°–100° C. for 30 minutes. The resulting viscous, yellow/red solution was diluted with water to give a final total solids concentration of 32 weight percent.

The reaction product (20%) was reacted with:

| | |
|---|---|
| Methyl Methacrylate monomers | 15% |
| Hydrogen peroxide (35%) | 6% |
| Water | 54% |
| Xylene sulfonate acid | 5% |

The vessel was charged with water, xylene sulfonic acid, the 32% composition, the methyl methacrylate monomers, heat to 50° C. and add hydrogen peroxide. The temperature was raised to 100°–105° C. and run 30 minutes. Water was added to gain desired solids level.

The product is useful as a textile coating, resin curing agent, and paint additive.

EXAMPLE 13

Preparation of a Defoamer

A defoamer is prepared by reacting:

| | |
|---|---|
| Methacrylate or acrylic acid | 12% |
| Water | 43% |
| Benzoyl peroxide | 5% |
| Nonyl phenol 1–5 mole (EO) | 40% |
| | 100% |

EXAMPLE 14

Preparation of a Chelating Agent

A chelating agent is prepared by reacting:

| | |
|---|---|
| Acrylic acid monomer | 15% |
| nitryl triacetic acid | 15% |
| sodium phosphate | 15% |
| Ammonium persulfate | 3% |
| Water | 52% |
| | 100% |

Product can be partially neutralized with diethylamine or triethylamine to pH 5, or more amine can be added to get to pH 8.

EXAMPLE 15

Preparation of a Flocculant

A flocculant is prepared by reacting:

| | |
|---|---|
| Acrylic acid monomer | 18% |
| Xylene sulfonic acid | 5% |
| Ammonium persulfate | 3% |
| Water | 74% |
| | 100% |

Product can be added to a waste stream in the presence of aluminum sulfate to form a bond with positively charged ions to form a precipitant mass for sludge press removal.

EXAMPLE 16

Preparation of an Anti-static Agent

An anti-static agent is prepared by reacting:

| | |
|---|---|
| Methacrylic Acid | 15% |
| Sodium xylene sulfonate | 20% |
| Xylene sulfonic acid | 5% |
| Phosphated 2-ethylhexanol | 20% |
| Ammonium persulfate | 3% |
| Water | 37% |
| | 100% |

The product can be used as an after treatment agent for textile fabrics and nylon carpets. The product can also be used as a component in nylon yarn manufacturing as a lubricant additive for static control.

EXAMPLE 17

Preparation of a Flame Retardant

A flame retardant is prepared by reacting:

| | |
|---|---|
| Methacrylic Acid | 18% |
| Sodium xylene sulfonate | 25% |
| Ammonium persulfate | 4% |
| Ammonium sulfamate | 15% |

-continued

| | |
|---|---|
| Naphthalene sulfonic acid condensate | 10% |
| Water | 28% |
| | 100% |

The product can be used on nylon and cotton, in exhaust after treat cycles, and spray dried on all other fabrics in small quantities for flame retardation.

EXAMPLE 18

Preparation of a Metal Cleaner

A metal cleaner is prepared by reacting:

| | |
|---|---|
| Acrylic acid monomer | 15% |
| Xylene sulfonic acid | 5% |
| Sodium xylene sulfonate | 15% |
| Ethylene glycol | 2% |
| Benzene sulfonic acid | 10% |
| Sodium phosphate | 5% |
| Water | 48% |
| | 100% |

EXAMPLE 19

Preparation of a Metal Coating

A metal coating is prepared by reacting:

| | |
|---|---|
| Methyl methacrylic | 5% |
| Methacrylic acid monomer | 10% |
| Acrylic acid monomer | 5% |
| Xylene sulfonic acid | 5% |
| Sodium xylene sulfonate | 10% |
| Fluoropolymer (Zonyl™ 5180, Du Pont) | 10% |
| Water | 55% |
| | 100% | and diluting the reaction product to 60% by blending with 20% isopropyl alcohol and 20% ammonium thiocyanate (50% solution). Spray on metal for quick drying protective coating.

Unless specified otherwise, the processes described in the Examples above used the following reaction process, adding the reaction components as follows: water, individual components, then monomer acid, then initiator. The temperature of the vessel was raised to 65°-70° C., and then heat removed. After exotherm, the reaction was allowed to proceed for 30 minutes. Final adjustments were made with water or hydrotrope to the desired solids level, and base added to the desired pH value.

Although all examples were performed in a batch process, continuous methods can also be used. Surfactants can also be incorporated for use in the emulsion processes.

EXAMPLE 20

Preparation of an Exhaustible Soil Resist Agent

Exhaustible soil resist agents were prepared with the components by weight percent as indicated below. The perfluoroalkylethyl alcohol was supplied by Atochem North America Fluorochemicals Division (Foralkyl EOH 6 NL, $R_f$=6, 8, 10 and 12). Another suitable perfluoroalkylethyl alcohol is Fluowet EA 93 (Hoechst Corporation). The perfluoroalkylethylmethacrylate was obtained by esterifying methacrylic anhydride with the perfluoroalkylethyl alcohol, followed by rinsing the product with mild NaOH.

The reactants were blended together, and the pH was adjusted to approximately 4 with 15% NaOH. The mixture was rapidly stirred and heated to 70°-80° C. for 30 minutes. The resulting product is useful as a soil resist agent and oil and water repellent for both hard and soft surfaces. The product can be applied to fabrics and other surfaces by conventional application techniques which include spraying, foaming, padding, kiss rolling, flooding, long bath exhaustion, etc.

| | 1 | 2 |
|---|---|---|
| Perfluoroalkylethylmethacrylates | 13.5 | 13.5 |
| Perfluoroalkylethylalcohols | 2.7 | 2.7 |
| Methacrylates Acid | 1.4 | 1.4 |
| 2-Ethylhexylmethacrylate | 1.4 | 1.4 |
| Sodium Xylenesulfonate - 40% | 40.5 | 40.5 |
| Sodium Dodecylbenzene Sulfonate - 40% | 2.7 | 2.7 |
| Sodium Persulfate | 4.0 | 1.4 |
| Water | 33.8 | 30.0 |
| Sodium 2-acrylamido-2-methylpropane sulfonate - 50% | 0 | 6.4 |
| | 100.0 | 100.0 |

EXAMPLE 21

Preparation of a Surfactant for Continuous Dying of Nylon Fiber

The reactor vessel was charged, in order, as follows: 58.13% polyoxyethylene tridecyl ether (9 mole, 80%) (CAS 24938-91-8); 12.10% methacrylic acid; 8.00% 2-ethyl hexanol; 15.00% xylene sulfonic acid (90%); 3.00% ammonium persulfate; and 3.77% water.

After charging, the vessel was heated under reflux at 105°-110° C. for one and a half hours, and then cooled to 80° C. After cooling to 80° C., the reaction product was diluted and neutralized as follows: 56.0% reaction Product; 14.0% sodium xylene sulfonate (40%); 23.0% water; and 7.0% triethanolamine (85%).

Modifications and variations of the present invention, new acrylic acid derivatives and their method of use, will be obvious to those skilled in the art from the foregoing detailed description of the invention. Such modifications and variations are intended to come within the scope of the appended claims.

We claim:

1. A water soluble polymeric composition prepared by polymerizing a monomer selected from the group consisting of $H_2C$=$CHCO_2X$, $H_2C$=$CHR^1CO_2X$, $HR^2C$=$CHCO_2X$, $HR^2C$=$CR^1CO_2X$, $HR^2C$=$CHCOX$, $H_2C$=$CHCOX$, $H_2C$=$CR^1COX$, $HR^2C$=$CR^1COX$, $H_2C$=$CHCON(R^3)_2$, $HR^2C$=$CHCON(R^3)_2$, $H_2C$=$CR^1CON(R^3)_2$, or $HR^2C$=$CR^1CON(R^3)_2$, or a combination thereof, in the presence of at least 10% by weight of reaction components, of an aromatic sulfonic acid or its salt, wherein:

$R^1$ and $R^2$ are independently an alkyl, alkenyl, aromatic, aralkyl or alkaryl moiety of $C_1$ to $C_{20}$ that is optionally substituted with one or more halogen; hydroxyl, sulfate, sulfonic acid, phosphoric acid, or carboxylic acid moieties (or the corresponding sulfonic, phosphoric or carboxylic acid esters), or a combination thereof;

$R^3$ is independently hydrogen or an alkyl, alkenyl, aromatic, aralkyl or alkaryl moiety of $C_1$ to $C_{20}$ that is optionally substituted with one or more halogen, hydroxyl, sulfate, sulfonic acid, phosphoric acid, or carboxylic acid moieties (or the corresponding sulfonic, phosphoric or carboxylic acid esters), or a combination thereof; and X is hydrogen, alkyl, alkenyl, aromatic, aralkyl or alkaryl moiety of $C_1$ to $C_{20}$ that is optionally substituted with one or more halogen, hydroxyl, carboxylic acid, phophoric acid, or sulfonic acid moieties (or the alkyl ester thereof); —$CH_2CH_2(CF_2CF_2)_nCF_2CF_3$, wherein n is 1–7; polyoxyalkylene; —$C(R^2)_2R^3Y$, wherein $R^3$ is alkylene or polyoxyalkylene (or a combination thereof), and Y is —$OSO_3H$, —$SO_3H$, —$CO_2H$, —$PO_3H$, —$OPO_3H$, or a salt therof; $CF_3(CF_2)_q^-$, wherein q is 1–11, and specifically including hexafluorobutyl and tetrafluoropropyl; sodium, potassiu, lithium, ammonium, or quaternary amine; and v is 0, 1, or 2.

2. The composition of claim 1, wherein the polyoxyalkylene is selected from the group consisting of —$(CH_2CH_2O)_mH$, —$(CH_2CH_2CH_2O)_mH$, —$(CH_2CH_2O)_mR^1$, and —$(CH_2CH_2CH_2O)_mR^1$ wherein m is 1–200.

3. The composition of claim 1 wherein a textile processing or cleansing compound is included in the reaction components.

4. The composition of claim 1 wherein $R^1$ is methyl.

5. The composition of claim 1 wherein X is hydrogen.

6. The composition of claim 1 wherein mixtures of acrylic acids are polymerized.

7. The composition of claim 1 wherein the aromatic sulfonic acid is selected from the group consisting of xylene sulfonic acid, toluene sulfonic acid, benzene sulfonic acid, cumene sulfonic acid, dodecylbenzene sulfonic acid, dodecyl diphenyloxide disulfonic acid, and sulfonated dihydroxydiphenylsulfone.

8. The composition of claim 1, wherein a fluorinated $C_3$–$C_{12}$ ester of acrylic acid or methacrylic acid is included in the reaction components.

9. The composition of claim 1, wherein a monomer selected from the group consisting of $CH_2=C(H)C(O)NHC(CH_3)_2CH_2SO_3^-Na^+$ and $CH_2=C(CH_3)C(O)NHCH_2CH_2SO_3^-Na^+$ is included in the reaction components.

10. The composition of claim 1, wherein $HOCH_2CH_2R_f$, wherein $R_f$ is $(CF_2CF_2)_nCF_2CF_3$, and n is 1–7 is included in the reaction components.

11. A water dispersible polymeric composition perpared by polymerizing a monomer selected from the group consisting of $H_2C=CHCO_2X$, $H_2C=CHR^1CO_2X$, $HR^2C=CHCO_2X$, $HR^2C=CR^1CO_2X$, $HR^2C=CHCOX$, $H_2C=CHCOX$, $H_2C=CR^1COX$, $HR^2C=CR^1COX$, $H_2C=CHCON(R^3)_2$, $HR^2C=CHCON(R^3)_2$, $H_2C=CR^1CON(R^3)_2$, or $HR^2C=CR^1CON(R^3)_2$, or a combination thereof, in the presence of at least 10% by weight of reaction components, of an aromatic sulfonic acid or its salt, wherein:

$R^1$ and $R^2$ are independently an alkyl, alkenyl, aromatic, aralkyl or alkaryl moiety of $C_1$ to $C_{20}$ that is optionally substituted with one or more halogen; hydroxyl, sulfate, sulfonic acid, phosphoric acid, or carboxylic acid moieties (or the corresponding sulfonic, phosphoric or carboxylic acid esters), or a combination thereof;

$R^3$ is independently hydrogen or an alkyl, alkenyl, aromatic, aralkyl or alkaryl moiety of $C_1$ to $C_{20}$ that is optionally substituted with one or more halogen, hydroxyl, sulfate, sulfonic acid, phosphoric acid, or carboxylic acid moieties (or the corresponding sulfonic, phosphoric or carboxylic acid esters), or a combination thereof; and X is hydrogen, alkyl, alkenyl, aromatic, aralkyl or alkaryl moiety of $C_1$ to $C_{20}$ that is optionally substituted with one or more halogen, hydroxyl, carboxylic acid, phophoric acid, or sulfonic acid moieties (or the alkyl ester thereof); —$CH_2CH_2(CF_2CF_2)_nCF_2CF_3$, wherein n is 1–7; polyoxyalkylene; —$C(R^2)_2R^3Y$, wherein $R^3$ is alkylene or polyoxyalkylene (or a combination thereof), and Y is —$OSO_3H$, —$SO_3H$, —$CO_2H$, —$PO_3H$, —$OPO_3H$, or a salt therof; $CF_3(CF_2)_q^-$, wherein q is 1–11, and specifically including hexafluorobutyl and tetrafluoropropyl; sodium, potassiu, lithium, ammonium, or quaternary amine; and v is 0, 1, or 2.

12. A water dispersible polymeric composition prepared by polymerizing a monomer selected from the group consisting of $H_2C=CHCO_2X$, $HR^2C=CHCO_2X$, or a combination thereof, in the presence of at least 10% by weight of reaction components, of an aromatic sulfonic acid or its salt, wherein:

$R^1$ and $R^2$ are independently an aliphatic or aromatic, moiety of $C_1$ to $C_{20}$ that is optionally substituted with one or more halogen or sulfonic acid; and X is hydrogen, aliphatic or aromatic moiety of $C_1$ or $C_{10}$ that is optionally substituted with one or more halogen, hydroxyl, or sulfonic acid moieties; sodium, potassium or ammonium.

13. The composition of claim 12, wherein $R^1$ is methyl.

14. The composition of claim 12, wherein X is hydrogen.

15. The composition of claim 12, wherein mixtures of acrylic acids are polymerized.

16. A water soluble polymeric composition prepared by polymerizing a monomer selected from the group consisting of $H_2C=CHCO_2X$, $HR^2C=CHCO_2X$, or a combination thereof, in the presence of at least 10% by weight of reaction components, of an aromatic sulfonic acid or its salt, wherein:

$R^1$ and $R^2$ are independently an aliphatic or aromatic, moiety of $C_1$ to $C_{20}$ that is optionally substituted with one or more halogen or sulfonic acid; and X is hydrogen, aliphatic or aromatic moiety of $C_1$ or $C_{10}$ that is optionally substituted with one or more halogen, hydroxyl, or sulfonic acid moieties; sodium, potassium or ammonium.

17. The composition of claim 16, wherein $R^1$ is methyl.

18. The composition of claim 16, wherein X is hydrogen.

19. The composition of claim 16, wherein mixtures of acrylic acids are polymerized.

20. A water dispersible polymeric composition prepared by polymerizing a monomer selected from the group consisting of $H_2C=CR^1CO_2X$, in the presence of at least 10% by weight of reaction components, of an aromatic sulfonic acid or its salt, wherein:

$R^1$ is selected from ethyl, propyl, isopropyl, butyl, isobutyl, t-butyl, pentyl, cyclopentyl, ispentyl, neopentyl, 2,2-dimethylbutyl, 2,3-dimethylbutyl, 2-ethylhexyl, octyl, decyl, dodecyl, stearyl, alkenyl, aromatic, aralkyl or alkaryl moiety of $C_1$ to $C_{20}$ that is optionally substituted with one or more halogen; hydroxyl, sulfate, sulfonic acid, phosphoric acid, or carboxylic acid moieties (or the corresponding sulfonic, phosphoric or carboxylic acid esters), or a combination thereof;

$R^3$ is independently hydrogen or an alkyl, alkenyl, aromatic, aralkyl or alkaryl moiety of $C_1$ to $C_{20}$ that is optionally substituted with one or more halogen, hydroxyl, sulfate, sulfonic acid, phosphoric acid, or carboxylic acid moieties (or the corresponding sulfonic, phosphoric or carboxylic acid esters), or a combination thereof; and X is hydrogen, alkyl, alkenyl, aromatic, aralkyl or alkaryl moiety of $C_1$ or $C_{20}$ that is optionally substituted with one or more halogen, hydroxyl, carboxylic acid, phosphoric acid, or sulfonic acid moieties (or the alkyl ester thereof); —$CH_2CH_2(CF_2CF_2)_nCF_2CF_3$, wherein n is 1–7; polyoxyalkylene; —$C(R^2)_2R^3Y$, wherein $R^3$ is alkylene or polyoxyalkylene (or a combination thereof), and Y is —$OSO_3H$, —$SO_3H$, —$CO_2H$, —$PO_3H$, —$OPO_3H$, or a salt thereof; $CF_3(CF_2)_q$-, wherein q is 1–11, and specifically including hexafluorobutyl and tetrafluoropropyl; sodium, potassium, lithium, ammonium, or quaternary amine; and v is 0, 1, or 2.

21. A water soluble polymeric composition prepared by polymerizing a monomer selected from the group consisting of $H_2C=CR^1CO_2X$, in the presence of at least 10% by weight of reaction components, of an aromatic sulfonic acid or its salt, wherein:

$R^1$ is selected from ethyl, propyl, isopropyl, butyl, isobutyl, t-butyl, pentyl, cyclopentyl, ispentyl, neopentyl, 2,2-dimethylbutyl, 2,3-dimethylbutyl, 2-ethylhexyl, octyl, decyl, dodecyl, stearyl, alkenyl, aromatic, aralkyl or alkaryl moiety of $C_1$ to $C_{20}$ that is optionally substituted with one or more halogen; hydroxyl, sulfate, sulfonic acid, phosphoric acid, or carboxylic acid moieties (or the corresponding sulfonic, phosphoric or carboxylic acid esters), or a combination thereof;

$R^3$ is independently hydrogen or an alkyl, alkenyl, aromatic, aralkyl or alkaryl moiety of $C_1$ to $C_{20}$ that is optionally substituted with one or more halogen, hydroxyl, sulfate, sulfonic acid, phosphoric acid, or carboxylic acid moieties (or the corresponding sulfonic, phosphoric or carboxylic acid esters), or a combination thereof; and X is hydrogen, alkyl, alkenyl, aromatic, aralkyl or alkaryl moiety of $C_1$ or $C_{20}$ that is optionally substituted with one or more halogen, hydroxyl, carboxylic acid, phosphoric acid, or sulfonic acid moieties (or the alkyl ester thereof); —$CH_2CH_2(CF_2CF_2)_nCF_2CF_3$, wherein n is 1–7; polyoxyalkylene; —$C(R^2)_2R^3Y$, wherein $R^3$ is alkylene or polyoxyalkylene (or a combination thereof), and Y is —$OSO_3H$, —$SO_3H$, —$CO_2H$, —$PO_3H$, —$OPO_3H$, or a salt thereof; $CF_3(CF_2)_q$-, wherein q is 1–11, and specifically including hexafluorobutyl and tetrafluoropropyl; sodium, potassium, lithium, ammonium, or quaternary amine; and v is 0, 1, or 2.

22. The composition of claim 1, wherein a monomer of the formula $CH_2=C(H$ or $CH_3)COOCH_2CH_2R_f$ is included in the reaction components, wherein $R_f$ is $CF_3CF_2(CF_2CF_2)_n$, and n=1–7.

23. The composition of claim 1, wherein $CH_2=C(H$ or $CH_3)(COOZ)$ is included in the reaction components, wherein Z is selected from the group consisting of —$(CH_2CH_2O)_mH$, —$(CH_2CH_2CH_2O)_mH$, —$(CH_2CH_2O)_mR^1$, and —$(CH_2CH_2CH_2O)_mR^1$, and m is 1–200.

* * * * *

UNITED STATES PATENT AND TRADEMARK OFFICE
CERTIFICATE OF CORRECTION

PATENT NO. : 5,629,376
DATED : May 13, 1997
INVENTOR(S) : R. Richard Sargent et al.

It is certified that error appears in the above-indentified patent and that said Letters Patent is hereby corrected as shown below:

Column 13, line 52, delete "$CH_2SO_3^{31}Na^+$" and insert --$CH_2SO_3^-Na^+$--

Column 23, line 16, claim 1, delete "potassiu" and insert --potassium--

Column 24, line 13, claim 11, delete "potassiu" and insert --potassium--

Signed and Sealed this

Sixth Day of October, 1998

Attest:

BRUCE LEHMAN

*Attesting Officer*    *Commissioner of Patents and Trademarks*